United States Patent [19]
Freund, Jr. et al.

[11] 4,325,261
[45] Apr. 20, 1982

[54] PULSED DC CONSTANT CURRENT MAGNETIC FLOWMETER

[75] Inventors: William R. Freund, Jr., Hatfield; John C. Grebe, Jr., Norristown; Paul K. Kuhn, Lansdale, all of Pa.

[73] Assignee: Emerson Electric Co., St. Louis, Mo.

[21] Appl. No.: 82,890

[22] Filed: Oct. 9, 1979

[51] Int. Cl.³ .............................................. G01F 01/58
[52] U.S. Cl. .............................. 73/861.12; 73/861.16
[58] Field of Search ........... 73/861.17, 861.12, 861.16; 361/154

[56] References Cited

U.S. PATENT DOCUMENTS

| | | | |
|---|---|---|---|
| 3,396,314 | 8/1968 | Corson et al. | 361/154 |
| 3,701,954 | 10/1972 | Seminatore et al. | 307/228 X |
| 3,783,687 | 1/1974 | Mannberg et al. | 73/861.17 |
| 3,842,669 | 10/1974 | Iversen | 73/861.12 X |
| 3,894,430 | 7/1975 | Rummel et al. | 73/861.17 |
| 4,144,751 | 3/1979 | Yokoyama | 73/861.12 X |
| 4,204,240 | 5/1980 | Schmoock | 73/861.12 |
| 4,236,410 | 12/1980 | Appel et al. | 73/861.12 |

Primary Examiner—Daniel M. Yasich
Attorney, Agent, or Firm—Polster, Polster and Lucchesi

[57] ABSTRACT

A magnetic flowmeter includes a coil driving circuit which controls both the maximum, steady state current and the current rise time through the coils and makes them independent of the inductance of the particular coil being driven. The maximum current is set by a reference voltage derived from a common source with a second reference voltage utilized in the signal processing chain. The ratio of these reference voltages therefore remains constant and the output signal is independent of the absolute value of the common source of the two reference voltages.

7 Claims, 1 Drawing Figure

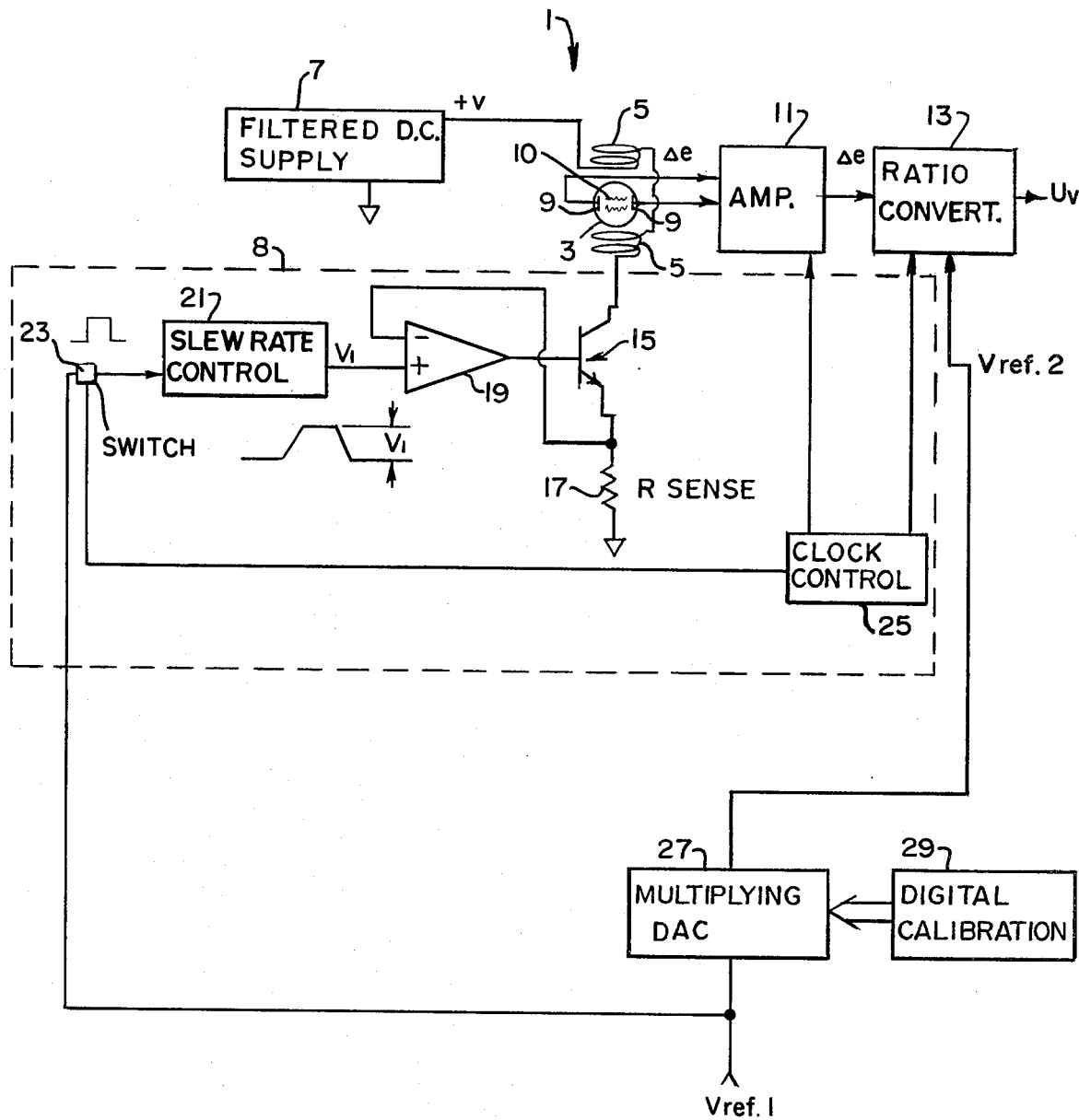

PULSED DC CONSTANT CURRENT MAGNETIC FLOWMETER

BACKGROUND OF THE INVENTION

This invention relates to electromagnetic flowmeters and in particular to such meters in which the electromagnet is energized by direct current pulses.

In an electromagnetic flowmeter a magnetic field across a flow tube generates a voltage in a fluid flowing through the tube. The voltage, which is proportional to flow rate, is sensed by a pair of electrodes in contact with the fluid and amplified by a signal processing system to produce an output signal which is proportional to flow rate.

The magnetic field across the flow tube is generated by an electromagnet excited by a driver circuit. Presently known electromagnetic flowmeters utilize either alternating current or pulsed direct current driver circuits. The advantages and disadvantages of each type of driver circuit are discussed in U.S. Pat. No. 3,783,687, to Mannherz et al, and in U.S. Pat. No. 3,965,738, to Watanabe, for example. Although, as pointed out in these patents, a pulsed direct current drive provides numerous advantages, perturbations (spikes) caused by the rise of current in the magnetic coils and fluctuations in the "steady state" current degrade the accuracy and precision of the meter. Many such meters are also subject to drift with time and changes of temperature.

SUMMARY OF THE INVENTION

One of the objects of this invention is to provide a magnetic flowmeter in which the perturbing effects of a pulsed DC excitation signal are minimized.

Another object is to provide such a system which is highly accurate and stable.

Other objects will occur to those skilled in the art in light of the following description and accompanying drawing.

In accordance with one aspect of this invention, generally stated, a magnetic flowmeter is provided comprising a body adapted to be connected in a flow system for measuring the flow of a fluid therethrough, coil means for generating a magnetic field in the fluid flowing through the body, means for producing an output voltage dependent on the electric field generated in the fluid flowing through the magnetic field, and signal processing means for converting the output voltage to an output signal, characterized by pulse forming means for producing pulses of filtered direct current through the coil means, a reference voltage source, means responsive to the reference voltage source for controlling the current of the pulses, and means operatively connected to the reference voltage source for generating a second reference voltage, the signal processing means including means for producing a signal dependent on the second reference voltage. Preferably, the signal processing means comprise a digital ratioing device for producing a digital signal indicative of a ratio between the output voltage and the second reference voltage.

In accordance with another aspect of the invention, the pulse forming means further comprise pulse shaping means for controlling the current rise time through the coil means. Preferably, the pulse forming means comprise a constant current driver fed from a filtered voltage source, and the pulse shaping means control the current rise time substantially independent of the inductance of the coil means.

BRIEF DESCRIPTION OF THE DRAWING

The FIGURE is a schematic diagram of a preferred embodiment of pulsed DC constant current magnetic flowmeter of the present invention.

DESCRIPTION OF THE PREFERRED EMBODIMENT

Referring now to the FIGURE, reference numeral 1 indicates a magnetic flowmeter system incorporating the present invention.

The flowmeter system 1 includes a flow tube 3 and a pair of oppositely disposed electromagnetic coils 5. The coils 5 are preferably "air core" coils having no external magnetic core and no ferromagnetic return path through the flow tube 3. The coils 5 are energized from a filtered voltage source 7 through a control circuit 8 of the present invention, described hereinafter. The voltage source 7 and control circuit 8 together comprise a pulse forming means. Oppositely disposed electrodes 9 sense a voltage generated by the flow of an electrically conductive fluid 10 through the magnetic field produced by the coils 5 across the tube 3. The voltage across the electrodes 9 is amplified by a differential amplifier 11 to produce an amplified flow-dependent signal which is fed to a ratioing converter 13 which produces an output signal for display or control. The ratioing converter 13 may, for example, be an analog to digital converter, such as a dual slope analog to digital converter or a microprocessor controlled digital word converter. It is preferably a high precision voltage to frequency converter as disclosed in co-pending application Ser. No. 82,765, filed concurrently herewith.

The control circuit 8 includes a power transistor 15, the collector of which is connected in series with the coils 5, and the emitter of which is connected through a sense resistor 17 to ground. The base of the transistor 15 is connected to the output of an operational amplifier 19. The inverting input of the operational amplifier 19 is connected to the emitter to the transistor 15. The non-inverting input of the operational amplifier 19 is connected to a slew rate control 21 which may be a conventional integrator and which acts as a pulse shaping circuit. The input of the slew rate control 21 is connected through a switch 23 to a reference voltage source $V_{ref.1}$. The switch 23 is controlled by a clock control 25. The clock control 25 produces regular timing pulses of fixed duration, and also applies timing pulses to the amplifier 11 and ratio converter 13, so as to provide an "on" time and "off" time.

It will be seen that the input to the slew rate control 21 is a train of pulses of fixed height $V_1$ equal to $V_{ref.1}$, of fixed frequency and of fixed duration. The slew rate control 21 does not affect the height $V_1$ or frequency of the pulses, but controls the rise time, such that the output pulse has a controlled linear slope on its rising side. Slew rate control circuits commonly control the slope of both the rise and fall sides of a pulse, so that the shape of the pulse when applied to the non-inverting terminal of the operational amplifier 19 has the trapezoidal shape indicated in the FIGURE. The slope of the rising edge of the pulse is chosen to be less than the natural rise rate of current through the coils 5. Because the coils 5 are air core coils, their inductance, hence their natural rise time, is considerably less than similar coils with magnetic cores.

The output of the operational amplifier 19 provides gating pulses to the base of the power transistor 15 such that the voltage across sense resistor 17 follows the pulses at the noninverting input of the operational amplifier 19. It will be seen that the control circuit 8 responds to the voltage source $V_{ref.1}$ to control the current through the coils 5. More specifically, the current and change in current through the coils 5 are controlled by the control circuit 8 so as to maintain a maximum current controlled by $V_{ref.1}$ and so as to minimize the voltage spike induced across the electrodes 9 by the change of current through the coils.

The voltage source $V_{ref.1}$ is also connected through a multiplying digital-to-analog converter (DAC) 27 to the ratio converter 13. The multiplying digital-to-analog converter is manually settable by means of a conventional digital calibration device comprising switches 29 to multiply the reference voltage by a preselected number in accordance with known techniques. It will be seen that calibration of the meter may be achieved by empirically selecting the number set by switches 29 into the digital-to-analog converter 27. The output $V_{ref.2}$ of the digital-to-analog converter 27 is fed to the ratio converter 13, which produces an output $U_v$ proportional to the ratio of the amplified flow dependent signal to the reference voltage $V_{ref.2}$.

It will be seen that the foregoing system provides an output signal which is proportional to average flow velocity regardless of any drift of the reference voltage.

Mathematically, the flow equation is:

$$V = \Delta e / s d \Delta B$$

where:
V is average velocity of flow,
$\Delta e$ is the change in electrode voltage,
$\Delta B$ is the change in magnetic induction,
s is a proportionality constant dependent on the geometry of the flow tube and coils, and
d is the electrode separation.
Thus, $$V \alpha \Delta e / \Delta B$$

Since no ferromagnetic materials are in the magnetic circuit, $\Delta B$ is proportional to $N\Delta I$, where N is the number of coil turns (a constant) and $\Delta I$ is the change in the current through the coil; $\Delta I$ is proportional to $V_{ref.1}$ divided by $R_{sense}$, therefore:

$$\Delta B \alpha V_{ref.1} / R_{sense}$$

or, $$V \alpha \Delta e R_{sense} / V_{ref.1}$$

where:
$V_{ref.1}$ is a reference voltage, and
$R_{sense}$ is a sense resistor for controlling the current (a constant).
Thus, $$V \alpha \Delta e / V_{ref.1}$$

Since $\Delta B$ is controlled and the output is taken from $\Delta e$ only, $$U_v \alpha \Delta e / V_{ref.2}, \text{ where}$$

$U_v$ is the signal indicative of average velocity of flow derived from the ratioing converter, and
$V_{ref.2}$ is a second reference voltage.

Since $V_{ref.1}$ is proportional to $V_{ref.2}$, $U_v$ is proportional to V.

Numerous variations in the magnetic flowmeter of this invention, within the scope of the appended claims, will occur to those skilled in the art in light of the foregoing disclosure. By way of example, although many of the advantages of the present invention arise from the combination of the means for controlling coil current slew rate and the use of a common reference voltage source for controlling the coil current and as a reference for the ratioing converter, each feature is usable with other systems. The digital-to-analog converter may be omitted or other means used for adjusting $V_{ref.2}$ with respect to $V_{ref.1}$. These variations are merely illustrative.

We claim:

1. In a magnetic flowmeter comprising a body adapted to be connected in a flow system for measuring the flow of a fluid therethrough, coil means for generating a magnetic field in said fluid flowing through said body, means for producing an output voltage dependent on the electric field generated in said fluid flowing through said magnetic field, and signal processing means for converting said output voltage to an output signal, the improvement comprising a reference voltage source, pulse forming means operatively connected to said coil means for producing pulses of filtered direct current through said coil means, said pulse forming means including means operatively connected to said reference voltage source and responsive to said reference voltage source for controlling the current of said pulses and hence for controlling the magnetic field produced by said coil means, and means operatively connected to said reference voltage source for generating a second reference voltage dependent on said first reference voltage, said second reference voltage being operatively connected to said signal processing means, said signal processing means including ratioing means responsive to said output voltage and to said second reference voltage for making said output signal dependent on said second reference voltage, whereby changes in said output voltage caused by changes in said reference voltage are compensated in said output circuit by changes in said second reference voltage, and said output signal is made substantially independent of fluctuations in said reference voltage.

2. The improvement of claim 1 wherein said signal processing means comprise a digital ratioing device for producing a digital signal indicative of a ratio between said output voltage and said second reference voltage.

3. The improvement of claim 1 wherein said pulse forming means further comprise pulse shaping means for controlling the current rise time through said coil means.

4. The improvement of claim 1 wherein said signal processing means comprise a ratio converter for producing a signal proportional to the ratio of said output voltage to said second reference voltage.

5. The improvement of claim 4 wherein said second reference voltage has a different value from the value of said reference voltage source, said system further including digitally settable calibration means for adjusting the relationship between said reference voltage source and said second reference voltage.

6. The improvement of claim 4 wherein said pulse forming means is a constant current driver, said pulse shaping means controlling said current rise time substantially independent of the inductance of said coil means.

7. In a magnetic flowmeter comprising a body adapted to be connected in a flow system for measuring the flow of a fluid therethrough, coil means for generating a magnetic field in said fluid flowing through said body, means for producing an output voltage dependent on the electric field generated in said fluid flowing through said magnetic field, and signal processing means for converting said output voltage to an output signal, the improvement comprising pulse forming means, said pulse forming means including a filtered voltage source operatively connected to said coil means, control means operatively connected to at least one of said voltage source and said coil means for controlling the flow of current from said voltage source through said coil means, a reference voltage source operatively connected to said control means for determining the maximum current flow through said coil means, and clocking means operatively connected to said control means for producing pulses of regulated direct current through said coil means, said pulses having a constant maximum current controlled by said reference voltage source, and pulse shaping means operatively connected to said control means for controlling the current rise time of said pulses through said coil means such that the slope of the rising edge of the pulses is less than the natural rise rate of the coils.

* * * * *

UNITED STATES PATENT AND TRADEMARK OFFICE
CERTIFICATE OF CORRECTION

PATENT NO. : 4,325,261
DATED : April 20, 1982
INVENTOR(S) : William R. Freund Jr. et al It is certified that error appears in the above—identified patent and that said Letters Patent is hereby corrected as shown below:

Column 3, line 61, "$U_v \Delta \alpha e / V_{ref}$. 2, where" should read "$U_v \alpha \Delta e / V_{ref}$. 2, where"

Signed and Sealed this

Twenth-eighth Day of September 1982

[SEAL]

Attest:

GERALD J. MOSSINGHOFF

Attesting Officer     Commissioner of Patents and Trademarks